(12) United States Patent
Philipp

(10) Patent No.: US 11,648,510 B2
(45) Date of Patent: May 16, 2023

(54) APPARATUS AND METHOD FOR INERTING A SPACE

(71) Applicant: DIEHL AVIATION GILCHING GMBH, Gilching (DE)

(72) Inventor: Jan Boris Philipp, Munich (DE)

(73) Assignee: Diehl Aviation Gilching GmbH, Gilching (DE)

( * ) Notice: Subject to any disclaimer, the term of this patent is extended or adjusted under 35 U.S.C. 154(b) by 358 days.

(21) Appl. No.: 16/846,872

(22) Filed: Apr. 13, 2020

(65) Prior Publication Data

US 2020/0353406 A1  Nov. 12, 2020

(30) Foreign Application Priority Data

May 8, 2019 (DE) .......................... 10 2019 003 257
Jul. 31, 2019 (EP) ..................................... 19189345

(51) Int. Cl.
| A62C 3/08 | (2006.01) |
| B01D 53/32 | (2006.01) |
| A62C 99/00 | (2010.01) |
| B64D 37/32 | (2006.01) |
| B64D 45/00 | (2006.01) |
| A62C 37/44 | (2006.01) |

(52) U.S. Cl.
CPC ............... *B01D 53/326* (2013.01); *A62C 3/08* (2013.01); *A62C 37/44* (2013.01); *A62C 99/0018* (2013.01); *B64D 37/32* (2013.01); *B64D 45/00* (2013.01); *B64D 2045/009* (2013.01)

(58) Field of Classification Search
CPC ......... B01D 53/326; A62C 3/08; A62C 37/44; A62C 99/0018; B64D 37/32; B64D 45/00; B64D 2045/009
USPC ...................................................... 169/45, 49
See application file for complete search history.

(56) References Cited

U.S. PATENT DOCUMENTS

| 1,904,828 | A | * | 4/1933 | Green | ..................... | A62C 37/10 |
| | | | | | | 169/39 |
| 2,719,589 | A | * | 10/1955 | Mapes | ................... | A62C 13/22 |
| | | | | | | 169/9 |
| 2,908,334 | A | * | 10/1959 | Duggan | ................. | A62C 5/002 |
| | | | | | | 169/44 |
| 3,019,843 | A | * | 2/1962 | Powell | ................... | A62C 5/022 |
| | | | | | | 169/56 |
| 3,174,550 | A | * | 3/1965 | Bugg | ..................... | B64D 37/32 |
| | | | | | | 169/44 |

(Continued)

FOREIGN PATENT DOCUMENTS

| CN | 104617354 A | 5/2015 |
| CN | 106463664 A | 2/2017 |

(Continued)

*Primary Examiner* — Chee-Chong Lee
(74) *Attorney, Agent, or Firm* — Laurence A. Greenberg; Werner H. Stemer; Ralph E. Locher

(57) ABSTRACT

An apparatus for inerting a space includes a metal-air battery, a feed channel for the introduction of air from an air source to the metal-air battery, and a discharge channel for the discharge of air from the metal-air battery to a volume of the space. A control unit controls an electrochemical reaction of the metal-air battery as a function of a fire situation within the space. A method for inerting a space, an inerting system, an inerting method and an aircraft or spacecraft are also provided.

16 Claims, 3 Drawing Sheets

(56) References Cited

U.S. PATENT DOCUMENTS

| | | | | |
|---|---|---|---|---|
| 3,217,456 | A | * 11/1965 | Quigg | ............... E04B 1/944 |
| | | | | 52/255 |
| 5,515,939 | A | 5/1996 | Korall et al. | |
| 2009/0321090 | A1 | 12/2009 | Bleil et al. | |
| 2017/0170451 | A1 | 6/2017 | Englert | |

FOREIGN PATENT DOCUMENTS

| | | |
|---|---|---|
| DE | 69406399 T2 | 5/1998 |
| EP | 2302728 A1 | 3/2011 |
| EP | 2873443 B1 | 11/2016 |
| WO | 2007054316 A1 | 5/2007 |

\* cited by examiner

APPARATUS AND METHOD FOR INERTING A SPACE

CROSS-REFERENCE TO RELATED APPLICATION

This application claims the priority, under 35 U.S.C. § 119, of German Patent Application DE 10 2019 003 257, filed May 8, 2019 and of European Patent Application EP 19 189 345, filed Jul. 31, 2019; the prior applications are herewith incorporated by reference in their entirety.

BACKGROUND OF THE INVENTION

Field of the Invention

The present invention relates to an apparatus and a method for inerting or maintaining inertness of a space for fire protection and/or extinguishing fire, in particular for use in aircraft or spacecraft.

In the field of aircraft or spacecraft, effective fire protection is made difficult by restricted room and weight limits. Inerting the room to be protected, i.e. providing the volume of the space with a sluggishly reactive gas or reducing the proportion of oxygen in the volume of the space, for fire prevention or extinguishing fire is known. European Patent EP 2 873 443 B1 describes, for example, a fire protection system for aircraft, in which, apart from firefighting using a liquid extinguishing medium, the introduction of an inert gas such as nitrogen into the liquid extinguishing medium or direct introduction of an inert gas into the space to be protected is also provided for. Pressurized gas bottles are generally used for storing the inert gas.

SUMMARY OF THE INVENTION

It is accordingly an object of the invention to provide an apparatus and a method for inerting or maintaining inertness of a space, which overcome the hereinafore-mentioned disadvantages of the heretofore-known apparatuses and methods of this general type and which make efficient fire prevention or extinguishing of fire possible with a low space and weight requirement.

With the foregoing and other objects in view there is provided, in accordance with the invention, an apparatus for inerting or maintaining inertness of a space, which comprises a metal-air battery; a feed channel for the introduction of air which connects an air source to the metal-air battery; a discharge channel for discharge of air which connects the metal-air battery to a volume of the space; and a control unit for controlling the electrochemical reaction of the metal-air battery as a function of a fire situation within the space.

In particular, the control unit is configured so that the electrochemical reaction of the metal-air battery is started in the event of a fire situation within the space. A corresponding signal indicating that a fire situation prevails can be received by the control unit from an operator, e.g. a pilot, or a sensor.

The air source is preferably formed by the space. The feed channel then connects a volume of the space to the metal-air battery. The metal-air battery can then be supplied through the feed channel with air from the space. Furthermore, when the metal-air battery is used in an aircraft, especially for inerting a freight space, the cabin ventilation system, further spaces or the bleed air system can also serve as air source.

This inerting apparatus is based on the concept of reducing the oxygen content of the volume of the space by introducing an inert gas which is formed by a metal-air battery and is fed into the volume of the space through the discharge channel. During operation of the metal-air battery, an inert gas which is low in oxygen or has a lower oxygen content than the air fed to the battery is produced. In particular, the apparatus is based on the concept of withdrawing oxygen from the volume of the space and the air present therein and using a metal-air battery which, by using its fundamental function during discharging, withdraws oxygen from the volume of the space, since the electrochemical reaction of the metal-air battery converts oxygen, for this withdrawal of oxygen from the volume of the space. The withdrawal of oxygen creates an inert or sluggishly reacting volume in the space to be protected, which participates only to a small extent in chemical reactions and therefore reduces a fire or explosion risk or inhibits an existing fire. The metal-air battery is therefore dimensioned in such a way that the volume of the space is inerted by operation of the metal-air battery and, in particular, the oxygen concentration within the volume of this space is thus decreased to a level at which a fire prevailing in the volume of the space is inhibited or extinguished. The metal-air battery and the volume of the space are consequently matched to one another in this respect.

Compared to pressurized gas bottles containing inert gas, metal-air batteries require a significantly lower weight and significantly less installation space to achieve the same effect, i.e. the same degree of reduction in the oxygen content of the volume of the space. In addition, the withdrawal of oxygen by using a metal-air battery is more environmentally friendly compared to the introduction of, for example, Halon into the space, and incurs a lower risk compared to the introduction of inert gases from pressurized gas bottles with an inherent explosion risk.

The inerting apparatus of the invention can have one or more metal-air batteries. In principle, it is possible to use any metal-air batteries for the inerting apparatus of the invention. Metals which can be used are, for example, aluminum, magnesium, lithium, zinc, silicon, etc.

The metal-air battery is connected to the volume of the space by using a feed channel for the introduction of air. The air necessary for the electrochemical reaction, or the oxygen present therein, is supplied to the battery by using the feed channel. The metal-air battery can, for example, be installed directly on a wall of the space, in which case the feed channel can, for example, be formed by an opening in the wall, or removed from the space, in which case the feed channel can, for example, be formed by a pipe. The apparatus preferably also has, in addition to the feed channel, a discharge channel with which the metal-air battery and the space to be inerted are likewise connected. A gas low in oxygen, i.e. the gas formed in the electrochemical reaction, is conveyed by using the discharge channel from the metal-air battery into the space. The oxygen content of the air within the volume of the space is reduced overall by recirculation of the gas which is low in oxygen.

The space to be inerted is a closed or closable space. In a preferred embodiment, a metal-air battery can be used for the inerting of and thus firefighting in a plurality of spaces to be inerted. In this case, the feed channels and discharge channels are formed by a piping system. The piping system preferably has valves by using which the space to be inerted or the volume to be inerted can be selected. The valves are, in particular, controllable by using the control unit and can be closed or opened by using the latter.

The control unit controls the electrochemical reaction of the metal-air battery, for example by direct controlling of the battery or indirectly by controlling a component connected to the battery.

In an embodiment of the invention, the inerting apparatus additionally includes at least one electric load which is connected to the metal-air battery as a component connected to the battery, where the control unit is configured for controlling operation of the electric load. Thus, the electrochemical reaction of the metal-air battery can be started by starting operation of the electric load. The electric load is preferably dimensioned so that the oxygen consumption of the metal-air battery required for inerting the space can be achieved. A regulated load which has a constant power regardless of the battery voltage of the metal-air battery can optionally also be used. In this embodiment, the metal-air battery, the volume of the space and the electric load are overall dimensioned and matched to one another so that the volume of the space is inerted on operation of the metal-air battery and, in particular, the oxygen concentration within the volume of the space is thus decreased to a level at which a fire present in the volume of the space is restricted or extinguished. After the desired state of inerting has been achieved, the load can be operated in such a way that this state is maintained by the associated operation of the metal-air battery. In this case, control of the electric load by using the control unit and thus indirectly also the control of the electrochemical reaction of the metal-air battery and thus the production of gas which is low in oxygen occur.

In a further embodiment, the metal-air battery, the volume of the space and the electric load are dimensioned and matched to one another in such a way that the operation of the metal-air battery maintains the inertness of the volume of the space.

In a further embodiment of the invention, the inerting apparatus includes a short circuit switch for selective short-circuiting of the metal-air battery, where the control unit is configured for controlling the short circuit switch. Thus, the electrochemical reaction of the metal-air battery can be started by short-circuiting the battery. The short circuit switch can be provided within or outside the metal-air battery.

The two above-mentioned embodiments can optionally also be combined. That is to say, at least one electric load and a short circuit switch can also be provided.

In a further embodiment of the invention, the inerting apparatus further includes a blower which is disposed in the feed channel or discharge channel in order to convey a stream of air from the volume of the space to the metal-air battery or from the metal-air battery into the volume of the space. In this way, the withdrawal of oxygen from the volume of the space can be assisted or made easier. In this embodiment, the blower may preferably be supplied with electric power from the battery voltage of the metal-air battery. The blower is thus then the electric load connected to the battery. The blower can in this embodiment be controlled by using the control unit and is thus also connected to the latter.

In a further embodiment of the invention, the inerting apparatus further includes an electrolyte container for storing an electrolyte and a transport element for conveying the electrolyte from the electrolyte container into the metal-air battery, where the control unit is configured for controlling the transport element. The electrolyte container can be positioned directly on the metal-air battery or at a distance from the latter. The transport element can, for example, have a valve and/or a pump which, for example, is disposed in a conduit or an opening between the electrolyte container and the battery. The electrolyte is preferably an aqueous electrolyte (e.g. saltwater) or an aprotic electrolyte. In this embodiment of the inerting apparatus, there is the opportunity of activating the metal-air battery by introduction of the electrolyte only before discharge of the battery, so that the metal-air battery can be stored dry without electrolyte before use, which improves its long-term stability.

In a further embodiment of the invention, the inerting apparatus further includes a sensor which is connected to the control unit and measures a parameter which correlates with inerting conditions desired in the volume of the space. The sensor is preferably an oxygen sensor for measuring the parameter in the form of an oxygen concentration in the volume of the space. In this embodiment, the electrochemical reaction of the metal-air battery can be regulated, in particular indirectly through the power of the electric load, as a function of the oxygen concentration in the volume of the space in order to bring the oxygen concentration to a desired low level. In this context, when the inerting apparatus is employed, for example, in an aircraft, the power of the electric load and thus the electrochemical reaction of the metal-air battery can also be regulated as a function of the altitude of the aircraft, so that, for example, the increased proportion of oxygen due to increased intrusion of ambient air can be take into account in a landing approach of the aircraft.

In a further embodiment of the invention, the inerting apparatus further includes a pressure sensor for measuring the increase in pressure during the landing approach of an aircraft. In this embodiment, the electrochemical reaction of the metal-air battery can be regulated, in particular indirectly through the power of the electric load, as a function of the increase in pressure in the volume of the space in order to bring the oxygen concentration to a desired low level.

In another embodiment of the invention, the inerting apparatus further includes a temperature sensor for measuring an air temperature in the space, which sensor is connected to the control unit. In this embodiment, the power of the electric load and thus the electrochemical reaction of the metal-air battery can be regulated as a function of the air temperature in the space. This aspect is based on the recognition that the oxygen content in the volume of the space has to be reduced to a lesser extent at low temperatures in order to achieve the desired fire protection effect.

With the objects of the invention in view, there is also provided a method for inerting a space, in which oxygen is withdrawn from a volume of the space by occurrence of an electrochemical reaction of a metal-air battery or during operation of the inerting apparatus of the invention.

As regards the advantages, preferred embodiments and explanations of terminology, reference may be made for supplementary information to the above explanations in connection with the inerting apparatus of the invention.

In an embodiment of the invention, a discharge current from the metal-air battery during occurrence of the electrochemical reaction of the metal-air battery is taken up by an electric load or the metal-air battery is short-circuited.

In a further embodiment of the invention, the metal-air battery is activated by introduction of an electrolyte from an electrolyte container before commencement of the electrochemical reaction.

In a further embodiment of the invention, the course of the electrochemical reaction of the metal-air battery is controlled as a function of an oxygen concentration in the volume of the space.

In another embodiment of the invention, the course of the electrochemical reaction of the metal-air battery proceeds as a function of an air temperature in the space. In particular, the electrochemical reaction of the metal-air battery is carried out less intensively at lower air temperatures in the space.

The above-described inerting apparatus of the invention and the above-described inerting method of the invention can preferably be used for a fire prevention system, a firefighting system or a fire prevention and firefighting system, particularly advantageously for aircraft or spacecraft, due to their reduced weight and space requirements. The volume of the space to be inerted is accordingly, for example, a freight space, a recreation space, a passenger cabin, an engineering space, a free gas volume in a fuel tank or the like.

With the objects of the invention in view, the above-described inerting apparatus of the invention and the above-described inerting method of the invention can preferably also be used in combination with a fire extinguishing system which in the case of fire introduces, for example, an extinguishing medium (liquid, gaseous or mixed) into the space for combatting the fire.

With the objects of the invention in view, there is concomitantly provided an inerting system, which includes a space having a volume and also the above-described apparatus for inerting the space, which is matched with respect to its inerting action to the volume of the space. In particular, the metal-air battery is dimensioned in such a way that the volume of the space is inerted by operation of the metal-air battery and, in particular, the oxygen concentration within the volume of the space is thus decreased to and maintained at a level at which a fire present in the volume of the space is restricted or extinguished. Furthermore, the metal-air battery is controlled appropriately by the control unit, in particular started as a function of the presence of a fire situation.

Other features which are considered as characteristic for the invention are set forth in the appended claims.

Although the invention is illustrated and described herein as embodied in an apparatus and a method for inerting a space, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
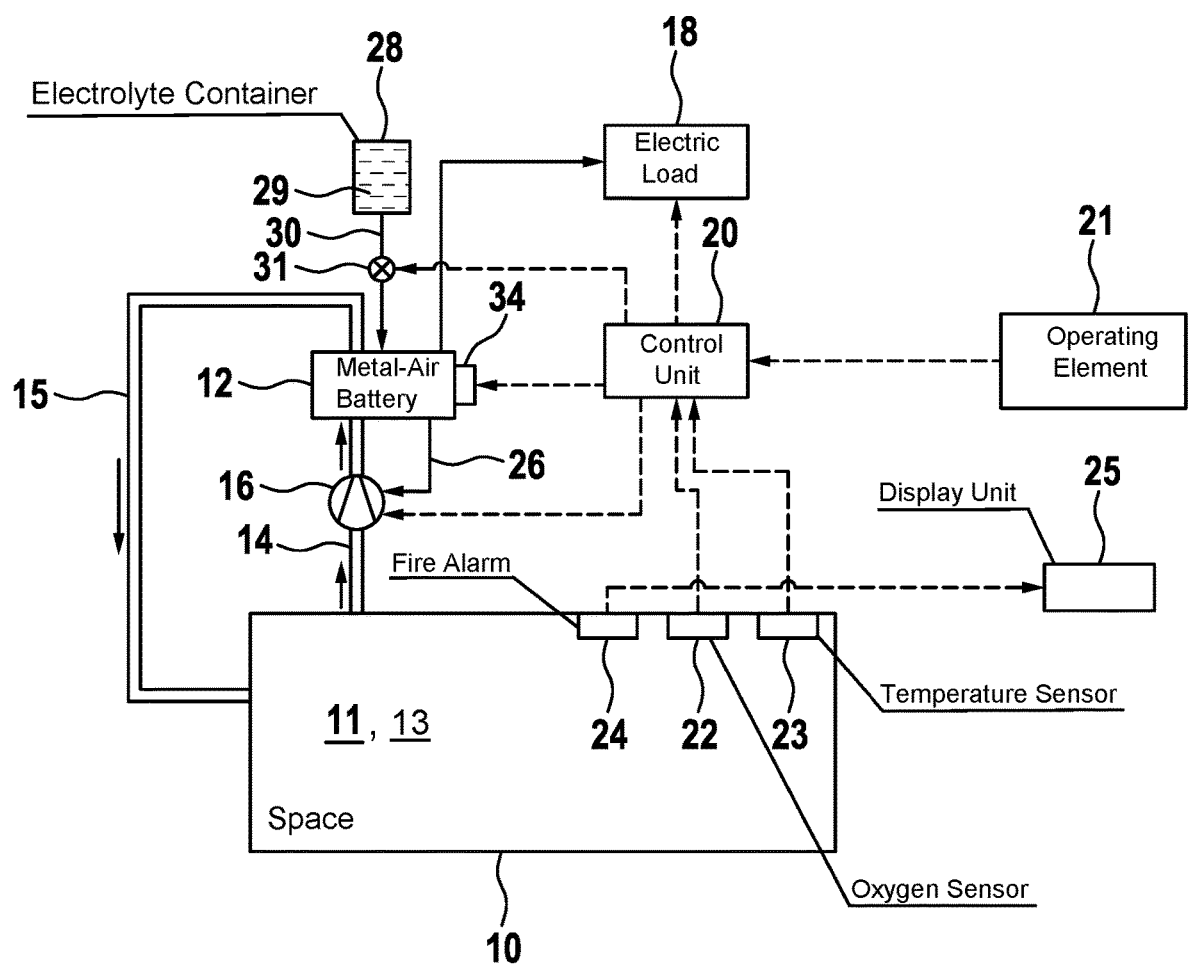
FIG. 1 is a block diagram of an inerting system for fire prevention and/or firefighting according to a working example of the invention.

Referring now to the figures of the drawings in detail and first, particularly, to FIG. 1 thereof, there is seen, by way of example, the structure of a working example of an inerting system for fire prevention and/or firefighting in an aircraft, including possible construction variants.

A space 10 to be protected is a closed space such as a freight space, an engineering space, a passenger cabin or a free gas volume in a fuel tank of an aircraft. An air-space volume 11 having an oxygen content is present in the space 10. In order to reduce a fire risk or to restrict a fire, the space 10 is inerted by using an inerting apparatus.

The inerting apparatus of the invention contains at least one metal-air battery 12 which is connected through a pipe-shaped feed channel 14 to an air source 13, in this case the volume 11 of the space, so that the metal-air battery can withdraw oxygen from the volume 11 of the space during the course of an electrochemical reaction. In metal-air batteries, the electric energy is generated by using an electrochemical reaction of metals with oxygen, with the oxygen being derived from the surroundings. In order to assist or help the extraction of oxygen from the volume 11 of the space, a blower 16 is preferably disposed in the feed channel 14 in order to convey the air stream from the volume 11 of the space to the metal-air battery 12. The metal-air battery 12 preferably has a high specific energy density, a low weight and low materials costs, for example an aluminum-air battery. However, it is also possible to use other metal-air batteries such as lithium-air batteries, zinc-air batteries, etc.

The function of power generation is not the first consideration in the case of this battery. The important thing is the consumption of oxygen by using a controlled electrochemical metal-oxygen reaction. The metal-air battery 12 can also be internally short-circuited by a membrane which is of low value or is not present. The commencement of the electrochemical reaction and thus inerting is then effected by introduction of an electrolyte into a reaction space of the metal-air battery 12.

As shown in FIG. 1, an electric load 18 is connected to the metal-air battery 12 in this working example. During operation of the electric load 18, the electric load 18 requires electric energy which it takes from the metal-air battery 12 which is discharged as a result and during this discharging process takes oxygen from the volume 11 of the space. When operation of the electric load 18 is started by using a control unit 20, the discharging process and thus the electrochemical reaction of the metal-air battery 12 is started. Since oxygen from the air being supplied is consumed in the electrochemical reaction, the reaction reduces the proportion of oxygen in the volume 11 of the space. The electric load 18 is dimensioned so that the oxygen consumption of the metal-air battery 12 required for inerting the space 10 can be achieved. A regulated load 18 which has a constant power independently of the battery voltage can optionally also be used. A plurality of electric loads 18 can optionally also be connected to the metal-air battery 12.

In this working example, the inerting apparatus has an oxygen sensor 22 for measuring an oxygen concentration in the volume 11 of the space, and a temperature sensor 23 for measuring an air temperature in the space 10. In addition, a fire alarm 24 for detecting a fire in the space 10 is disposed in the space 10. The oxygen sensor 22 and the temperature sensor 23 are connected wirelessly or by using a cable to the control unit 20. The fire alarm 24 is connected to a display unit 25 in the cockpit of the aircraft. In this way, an operator, in particular the pilot, is informed of the presence of a fire situation in the space 10. The pilot can in return send the signal to the inerting apparatus by using an operating element 21, which is connected to the control unit 20, to indicate that a fire situation is present and thus start operation of the inerting apparatus.

The control unit 20 can then start the electric load 18 as a function of the fire situation and then regulate the power uptake of the electric load 18 and thus the discharge power of the metal-air battery as a function of the oxygen concentration in the volume 11 of the space and the air temperature in the space 10. In this way, it can, in particular, be ensured that the oxygen content in the space 10 does not exceed a predetermined limit value, with this limit value increasing somewhat at lower air temperatures. In addition, the degree of inerting can be increased when a fire is recognized in the space 10 compared to fire prevention without fire in the space 10, in order to assist firefighting.

For firefighting, the operation of the inerting apparatus can be started after activation n of fire extinguishing, for example after a short delay after introduction of the extinguishing medium (gas, liquid or mixed) or simultaneously. In particular, the inerting apparatus can be used in order to maintain an inert atmosphere, which has for example been produced by introduction of gas, over a prolonged period of time in an extinguishing volume. This period of time is the time to safe landing in the case of aircraft.

Some optional variants of the embodiment described will now be explained in more detail and some of these are likewise depicted in FIG. 1.

In the working example of FIG. 1, the metal-air battery 12 is positioned at a distance from the space 10 and is connected to the space 10 through the feed channel 14 in the form of a pipe, in which the blower 16 for conveying the air stream is disposed. The oxygen-depleted air is recirculated through a discharge channel 15 into the volume 11 of the space. As an alternative, the metal-air battery 12 can also be installed, for example, directly on a wall of the space 10 and be connected to the interior of the space through a feed channel 14 in the form of an opening in the wall. In this case, the blower 16 may be able to be omitted.

In embodiments with a blower 16 in the feed channel 14, there is also the possibility of the blower 16 being supplied with electric power from the battery voltage of the metal-air battery 12. As indicated in FIG. 1, a corresponding power supply line 26 which connects the blower 16 to the metal-air battery 12 can be provided.

It is known that metal-air batteries usually only have a low long-term stability. In the inerting system of the invention, however, the metal-air battery 12 can preferably be stored dry. That is to say, the metal-air battery 12 is stored without electrolyte and is activated by introduction of an electrolyte into the battery 12 only when it is required for use for fire prevention or firefighting. As shown in FIG. 1, the inerting apparatus has, for example, an electrolyte container 28 in which an electrolyte (e.g. saltwater) 29 is stored for this purpose. The electrolyte container 28 is connected through a conduit (e.g. pipe or hose) 30 to the metal-air battery 12. A transport element 31 for conveying the electrolyte 29 from the electrolyte container 28 into the metal-air battery 12 is additionally installed in or on this conduit 30. The transport element 31 includes, for example, a valve and/or a pump. The transport element 31 is controlled by the control unit 20 in order to activate the metal-air battery 12 when required. In an alternative variant, the electrolyte 29 can also be stored, for example, in a glass ampoule within the metal-air battery 12 and the transport element 31 can, for example, be a pin or pyrocharge which breaks the glass ampoule when required in order to activate the metal-air battery 12.

In the working example of FIG. 1, at least one electric load 18 is connected to the metal-air battery 12 in order to perform the discharging process which effects the withdrawal of oxygen from the space 10. As an alternative or in addition, the metal-air battery 12 can also be provided with a short circuit switch 34 which is disposed within or outside the metal-air battery 12. The short circuit switch 34 is actuated when required by the control unit 20 in order to short-circuit the electrodes of the metal-air battery 12 and thus carry out the discharge process.

Figure 2:
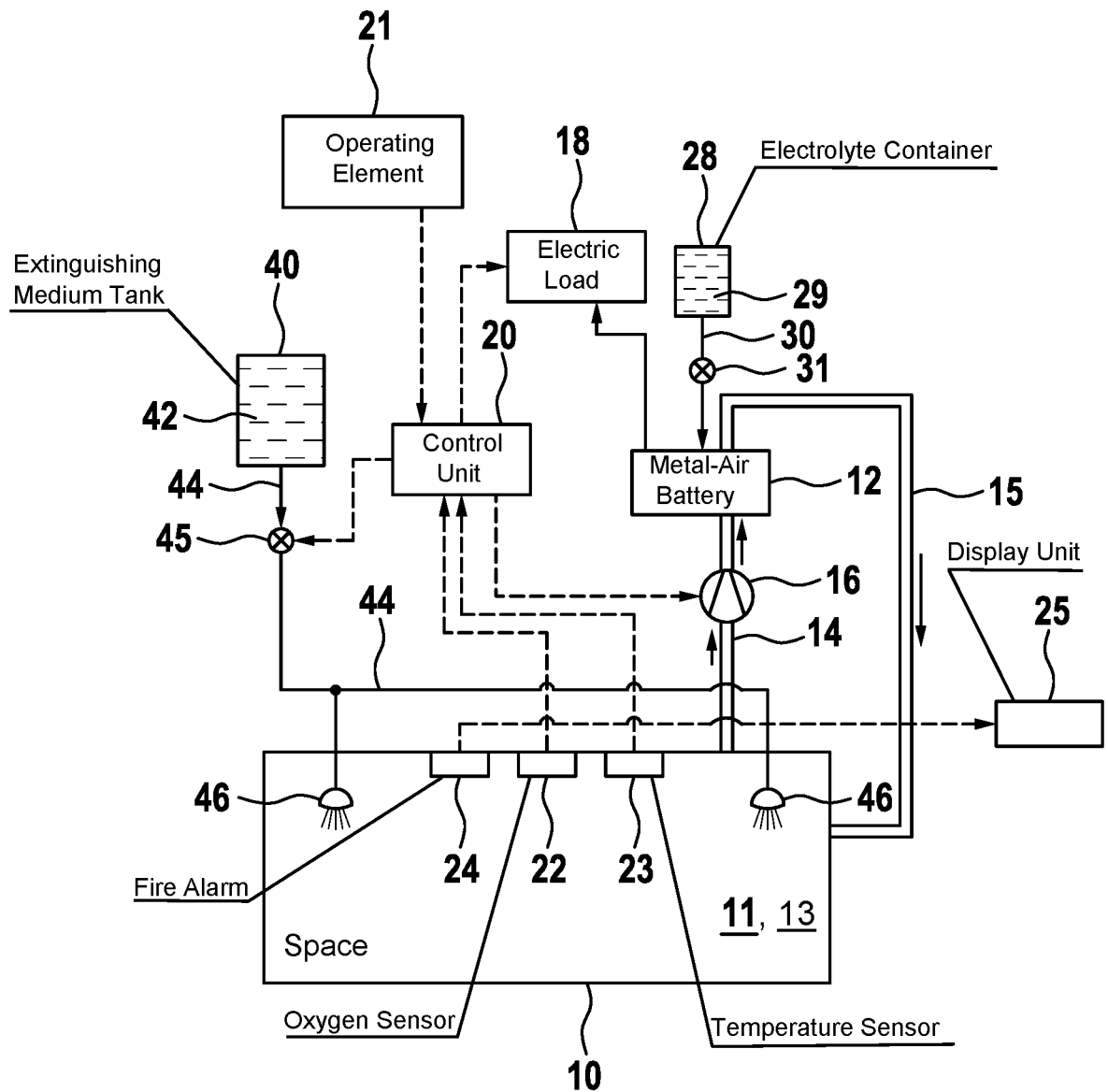
FIG. 2 is a block diagram of the inerting system of FIG. 1 combined with a fire extinguishing system for firefighting according to a working example of the invention.

FIG. 2 shows a further working example of the invention in which the above-described inerting apparatus of FIG. 1 is combined with a fire extinguishing system for firefighting. In this case, identical or corresponding components are denoted by the same reference numerals as in FIG. 1.

The inerting apparatus contains, in particular, at least one metal-air battery 12 which is connected to the volume 11 of the space through a feed channel 14, at least one electric load 18 which is connected to the metal-air battery and a control unit 20. As shown in FIG. 2, the inerting apparatus can additionally contain, depending on the variant, an electrolyte container 28, a short circuit switch 34, an oxygen sensor 22, a temperature sensor 23 and a fire alarm 24.

In this working example, the fire extinguishing system includes an extinguishing medium tank 40 for stocking an extinguishing medium (e.g. extinguishing water, nitrogen, inert gas, water mist or a combination thereof) 42. The fire extinguishing system additionally includes an extinguishing medium conduit 44 which is connected at one end to the extinguishing medium tank 40 and at the other end is terminated by one or more outlet openings 46 in the interior of the space 10 in order to introduce the liquid extinguishing medium 42 into the space 10 in order to combat fire.

A valve 45 is preferably also disposed in the extinguishing medium conduit 44 in order to convey the extinguishing medium 42 from the pressurized extinguishing medium tank 40 to the outlet openings 46 in the space 10. As indicated in FIG. 2, this valve 45 is preferably likewise controlled by the control unit 20 of the inerting apparatus. That is to say, the control unit 20 is a joint control unit for the inerting apparatus and the fire extinguishing system.

Figure 3:
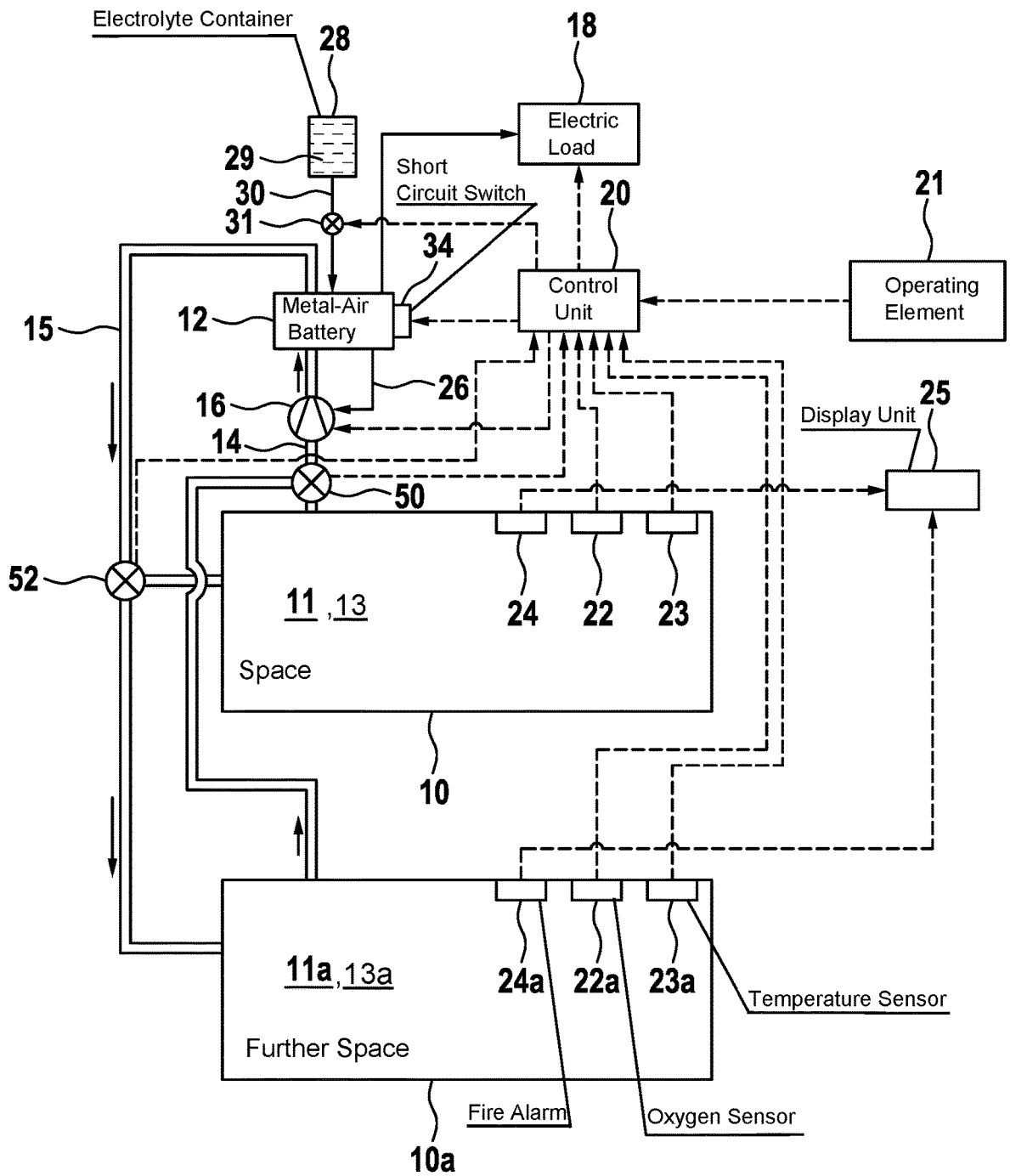
FIG. 3 is a block diagram of the inerting system of FIG. 1 with a further volume of a space according to a working example of the invention.

FIG. 3 shows a working example of the invention analogous to FIG. 1, in which, however, the metal-air battery 12 is assigned to a further space 10a having a volume 11a. This space 10a also represents a further air source 13a in this case. An oxygen sensor 22a, a temperature sensor 23a and a fire alarm 24a are disposed in the space. The oxygen sensor 22a and the temperature sensor 23a are connected wirelessly or by using a cable to the control unit 20. The fire alarm 24a is connected to the display unit 25 in the cockpit of the aircraft.

In this case, the feed channels 14 and discharge channels 15 are formed by a piping system. The piping system has valves 50, 52 through the use of which the space 10, 10a to be inerted or the volume 11, 11a to be inerted can be selected. The valves 50, 52 can, in particular, be controlled by using the control unit 20 and can be closed or opened by using the latter.

LIST OF REFERENCE NUMERALS 10, 10a (Closed) space
11, 11a Volume of the space
12 Metal-air battery
13, 13a Air source
14 Feed channel
15 Discharge channel
16 Blower
18 (Electric) load 21 Operating element
20 Control unit
22, 22a Oxygen sensor
23, 23a Temperature sensor
24, 24a Fire alarm
25 Display unit
26 Power supply line
28 Electrolyte container
29 Electrolyte
30 Conduit
31 Transport element
34 Short circuit switch
40 Extinguishing medium tank
42 Extinguishing medium
44 Extinguishing medium conduit
45 Valve
46 Outlet opening

The invention claimed is:

1. An apparatus for inerting or maintaining inertness of a space, the apparatus comprising:
   a metal-air battery configured to be stored dry and free of electrolyte before being used for fire prevention or firefighting and configured to be activated by an introduction of electrolyte into said metal-air battery only for fire prevention or firefighting;
   an electrolyte container for storing the electrolyte;
   a transport element for conveying the electrolyte from said electrolyte container into said metal-air battery;
   an air source;
   a feed channel for introducing air from said air source to said metal-air battery;
   a discharge channel for discharging air from said metal-air battery to a volume of the space and for reducing an oxygen content of the volume of the space by introducing an inert gas formed by said metal-air battery and fed into the volume of the space through said discharge channel; and
   a control unit configured to start an electrochemical reaction of said metal-air battery in an event of a fire situation within the space, said control unit configured for controlling said transport element to activate said metal-air battery by introduction of the electrolyte before commencement of a discharging operation.

2. The inerting apparatus according to claim 1, wherein said air source is formed by the space.

3. The inerting apparatus according to claim 1, which further comprises:
   an electric load connected to said metal-air battery,
   said control unit being configured for controlling operation of said electric load.

4. The inerting apparatus according to claim 1, which further comprises:
   an ON/OFF switch for selectively switching said metal-air battery on and off;
   said control unit being configured for controlling said ON/OFF switch.

5. The inerting apparatus according to claim 1, which further comprises a blower disposed in said feed channel for conveying an air stream from the volume of the space to said metal-air battery.

6. The inerting apparatus according to claim 5, wherein said blower is connected to said metal-air battery for supplying said blower with power.

7. The inerting apparatus according to claim 1, wherein said control unit is configured for controlling said transport element.

8. The inerting apparatus according to claim 1, which further comprises a sensor connected to said control unit for measuring a parameter correlated with desired inerting conditions in the volume of the space.

9. An inerting system, comprising:
   an inerting apparatus according to claim 1 for at least one of preventing or fighting a fire in an aircraft or a spacecraft.

10. An inerting system, comprising:
    a space having a volume; and
    an inerting apparatus according to claim 1 having an inerting action matched to the volume of the space.

11. An aircraft or spacecraft, comprising:
    an aircraft or spacecraft space to be inerted, said space having a volume; and
    an inerting apparatus according to claim 1.

12. A method for inerting a space, the method comprising:
    providing a metal-air battery;
    storing the metal-air battery dry and without electrolyte before being used for fire prevention or firefighting;
    activating the metal-air battery by introduction of the electrolyte into the metal-air battery only when the metal-air battery needs to be used for fire prevention or firefighting;
    storing the electrolyte in an electrolyte container;
    using a transport element to convey the electrolyte from the electrolyte container into the metal-air battery;
    providing an air source;
    using a feed channel for introducing air from the air source to the metal-air battery;
    using a discharge channel for discharging air from the metal-air battery to a volume of the space and for reducing an oxygen content of the volume of the space by introducing an inert gas formed by the metal-air battery and fed into the volume of the space through the discharge channel; and
    using a control unit:
       to start an electrochemical reaction of the metal-air battery in an event of a fire situation within the space, and
       to withdraw oxygen from the volume of the space by carrying out the electrochemical reaction of the metal-air battery, and
       to control the transport element to activate the metal-air battery by introduction of the electrolyte before commencement of a discharging operation.

13. The method according to claim 12, which further comprises using an electric load or switching the metal-air battery to take up a discharge current from the metal-air battery during the electrochemical reaction of the metal-air battery.

14. The method according to claim 12, which further comprises controlling a course of the electrochemical reaction of the metal-air battery as a function of an oxygen concentration in the volume of the space.

15. The method according to claim 12, which further comprises carrying out a course of the electrochemical reaction of the metal-air battery as a function of an air temperature in the space.

16. An inerting method, comprising:
    using the inerting method according to claim 12 for at least one of preventing or fighting a fire in an aircraft or a spacecraft.

* * * * *